(12) United States Patent
Ward

(10) Patent No.: US 8,570,716 B2
(45) Date of Patent: Oct. 29, 2013

(54) BOX FOR HOUSING AN ELECTRICAL METER

(76) Inventor: Tim Ward, Duncan (CA)

( * ) Notice: Subject to any disclaimer, the term of this patent is extended or adjusted under 35 U.S.C. 154(b) by 218 days.

(21) Appl. No.: 13/197,696

(22) Filed: Aug. 3, 2011

(65) Prior Publication Data

US 2013/0033799 A1 Feb. 7, 2013

(51) Int. Cl.
*H02B 1/26* (2006.01)

(52) U.S. Cl.
USPC .............. 361/664; 361/679.01; 361/679.02; 361/622; 361/659; 174/50; 174/520; 312/223.2

(58) Field of Classification Search
USPC ............ 361/679.01, 679.02, 622, 659, 664, 361/667, 672, 675, 641, 668; 174/50, 174/50.51, 50.54, 58, 520; 312/223.2, 312/223.3, 265.5, 296; 220/3.3, 3.9, 3.6; 248/205.1, 217.2, 216.4
See application file for complete search history.

(56) References Cited

U.S. PATENT DOCUMENTS

| | | | | | |
|---|---|---|---|---|---|
| 2,167,419 | A | * | 7/1939 | Heanes | 361/659 |
| 2,345,084 | A | * | 3/1944 | Young | 361/704 |
| 3,123,744 | A | * | 3/1964 | Fisher | 361/659 |
| 3,591,835 | A | * | 7/1971 | Sloop | 361/672 |
| 3,895,179 | A | * | 7/1975 | Wyatt | 174/50 |
| 6,421,229 | B1 | * | 7/2002 | Campbell et al. | 361/622 |
| 6,879,483 | B2 | * | 4/2005 | Johnson et al. | 312/265.5 |
| 7,075,003 | B2 | * | 7/2006 | Johnson et al. | 174/50 |

FOREIGN PATENT DOCUMENTS

NZ            551419        * 11/2006

* cited by examiner

*Primary Examiner* — Michail V Datskovskiy
(74) *Attorney, Agent, or Firm* — Davis & Bujold, PLLC; Michael J. Bujold

(57) ABSTRACT

An electrical meter box contains an electrical circuit that connects to a consumption meter. The box has a removable front panel, a rear wall having punch-outs for wire access to the inside of the box and four side walls. A flange surrounds the outside of the four side walls of the box and is disposed behind the front panel a predetermined distance. The flange has holes for mounting the box to a structure. The flange can be taped to the structure or placed underneath a vapor barrier for moisture integrity.

11 Claims, 3 Drawing Sheets

BOX FOR HOUSING AN ELECTRICAL METER

CROSS-REFERENCE TO RELATED APPLICATIONS

Not applicable.

FEDERAL SPONSORED RESEARCH

Not applicable

FIELD OF THE INVENTION

This invention is related to field of electricity and housings, boxes and receptacles, and specifically to a box for housing an electrical meter.

BACKGROUND OF THE INVENTION

Electrical meter boxes are well known in the electrical and construction industries. These boxes enclose electrical circuits carrying line voltage and are connected to an electrical meter for monitoring and recording consumption. These boxes can be installed inside or outside. Making the meter box weather proof is quite difficult. During new home construction the challenge is to tie the meter box into the building envelope so that the building vapor barrier is not compromised by the meter box.

There is an ongoing requirement for an electrical meter box that is easy to install and capable of being integrated with the building envelope.

SUMMARY OF THE INVENTION

My solution makes it much easier for electricians to install an electrical meter box and for builders to integrate it into their building envelope.

In one embodiment of my invention there is provided a box for housing an electrical meter that is mounted into a structure such as a wall of a house or commercial building. The box has an outside surface and an inside surface. The box comprises four side walls, a rear wall and a front wall. Each of the walls has an inside surface and an outside surface. The box includes a surrounding rectangular mounting flange for fixing the box to the structure outside surface in such a manner that it can be integrated in a moisture proof manner with the building envelope. The mounting flange is fixed to and contiguous with the outside surface of the four walls. The front wall outside surface defines a front plane and the rectangular mounting flange is disposed a predetermined distance rearward of the front plane. The result is that the front wall protrudes from the outside surface of the structure for easy access by an electrician.

In another embodiment of my invention the box front wall is a removable panel over a front opening for exposing a set of electrical contacts within the box.

In yet another embodiment of the invention the removable panel includes a circular mounting flange for mounting an electrical meter. The front panel is disposed over the front opening so that the set of electrical contacts operatively connect to the electrical meter.

In yet another embodiment of my invention the rectangular mounting flange has a plurality of holes for mounting the electrical circuit box to the structure outside surface. One of the holes includes at least one centering hole. The rear wall comprises a plurality of access points for wiring into the box.

The rectangular mounting flange comprises a unitary frame and extends outward from the four side walls an equal predetermined distance. The edges of the rectangular mounting flange are taped to the structure outside surface for moisture proofing and can be disposed beneath a vapour barrier of the structure for moisture proofing.

The rear wall wiring access points are offset from the plurality of flange mounting holes so that a screw or other fixing means in one of the holes will not contact a wire entering one of said plurality of access points. The bottom wall of the box has an increased depth in order to accommodate the set-back of the flange and the electrical service pipe into the bottom of the box.

DETAILED DESCRIPTION OF THE INVENTION

Figure 1:
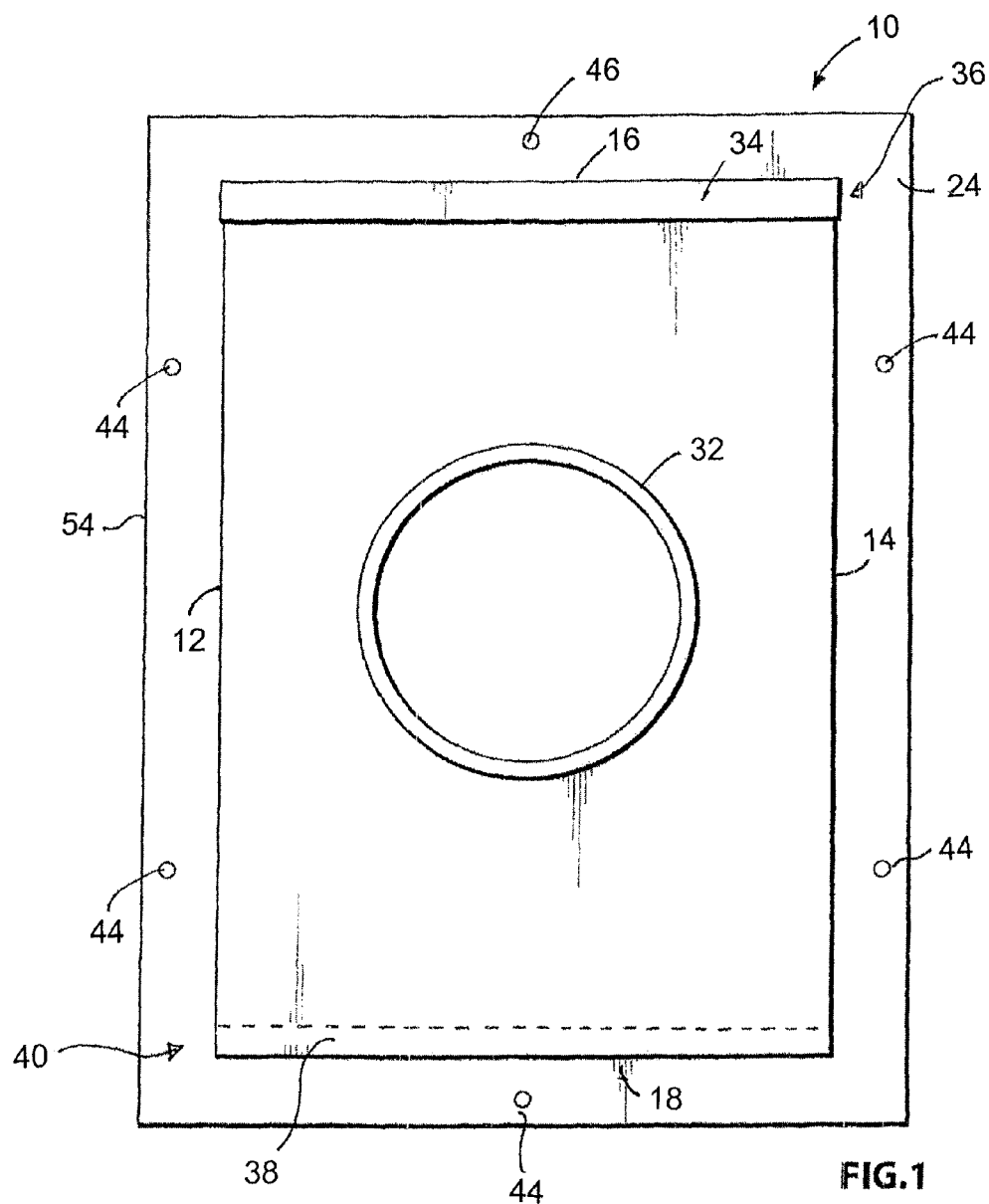
FIG. 1 is a front view of one embodiment of the invention.
Figure 2:
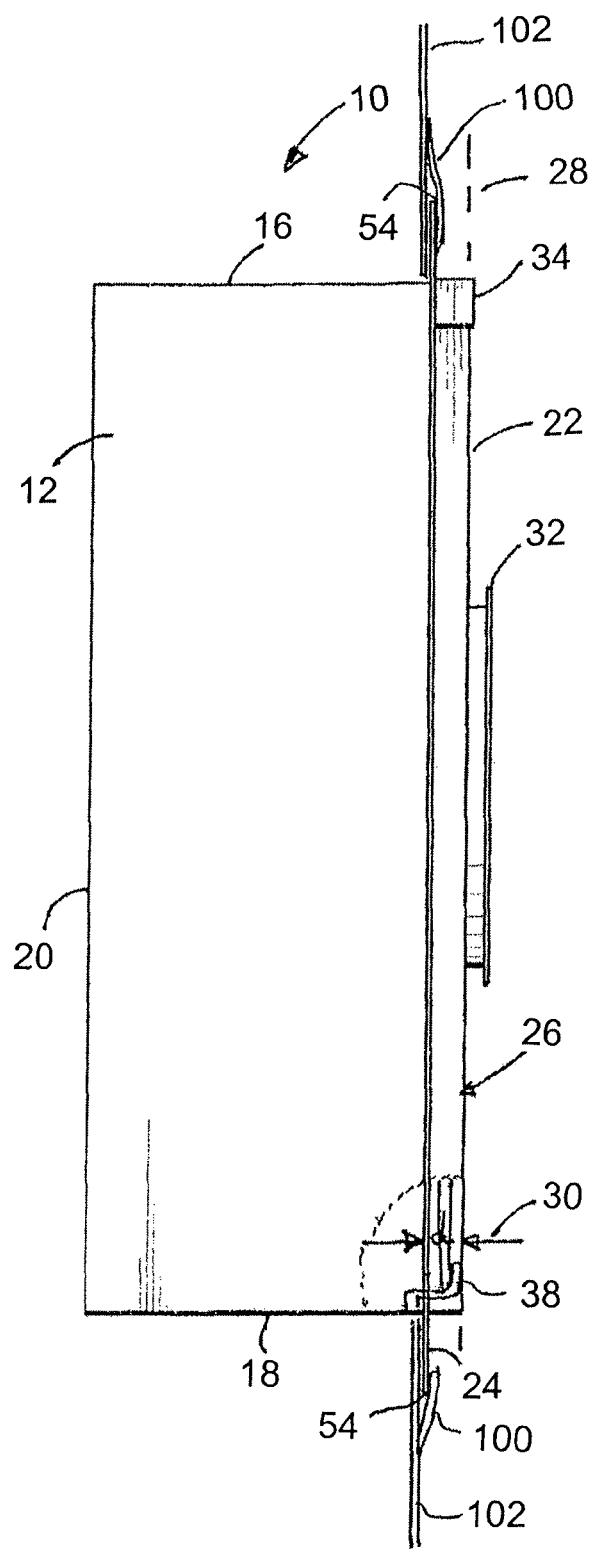
FIG. 2 is a side view of one embodiment of the invention.
Figure 3:
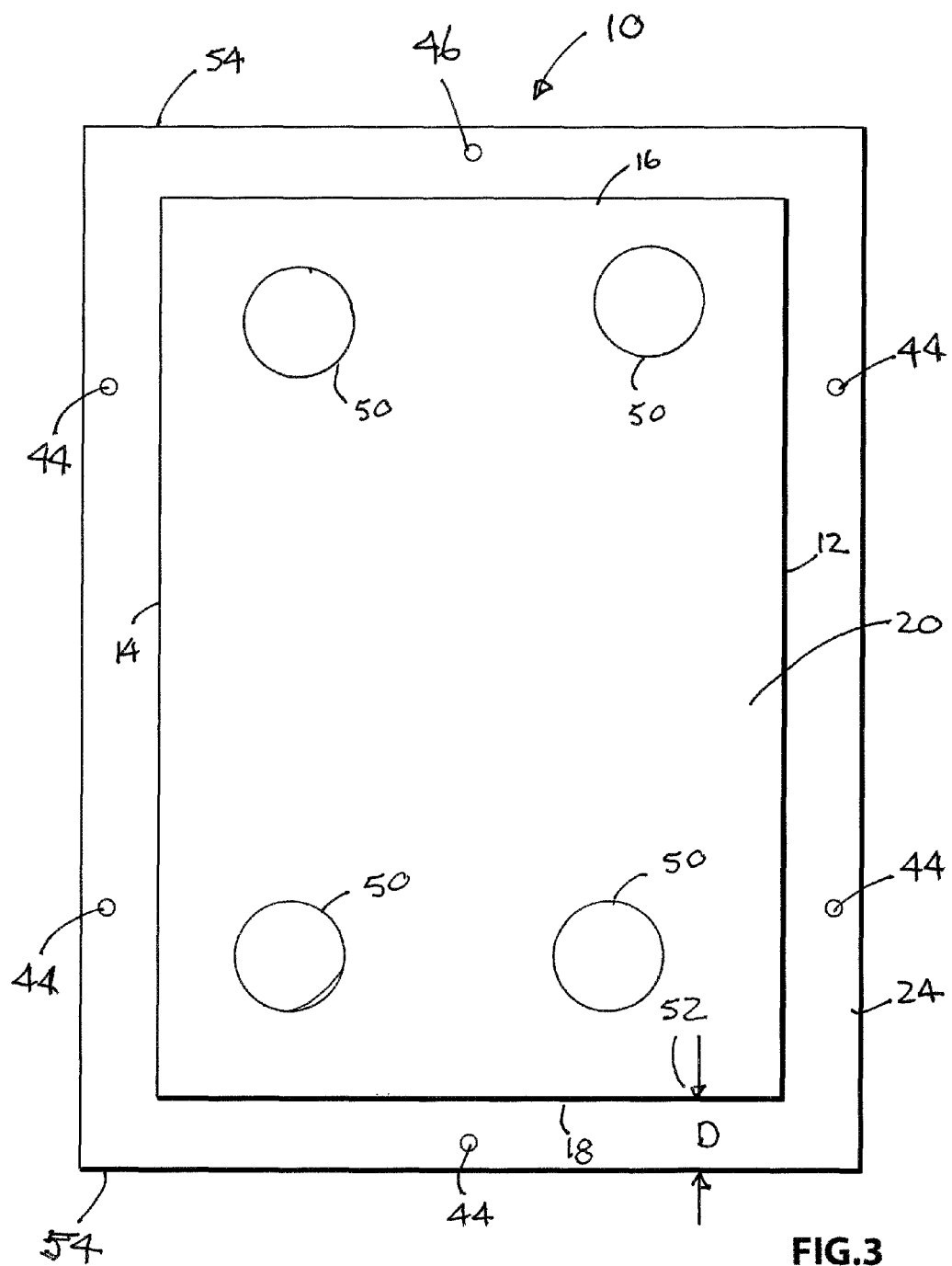
FIG. 3 is a rear view of one embodiment of the invention.

Referring to the Figures, my invention 10 is a box for housing an electrical meter. The box is mounted into a structure having an outside surface and an inside surface. The box comprises four side walls 12, 14, 16 and 18, a rear wall 20 and a front wall 22. Each of the walls has an inside surface and an outside surface which are not numbered. A rectangular mounting flange 24 surrounds the box 10 for fixing the box to a structure outside surface. The rectangular mounting flange 24 is fixed to and contiguous with the outside surface of the four walls 12, 14, 16 and 18. The front wall 22 outside surface 26 defines a front plane 28. The rectangular mounting flange 24 is disposed a predetermined distance (d) 30 rearward of the front plane 28. The result is that the front wall 22 protrudes from the outside surface of the structure for easy access by an electrician. To accommodate this distance (d) the depth of the box $d_1$ has been increased at least an amount (d) so that the electrical service pipe (not shown) that connects to the bottom of the box has sufficient room.

In one embodiment of the invention the front wall 22 is a removable panel over a front opening for exposing a set of electrical contacts within the box. The removable front wall panel 22 includes a circular mounting flange 32 for mounting an electrical meter. When the removable panel 22 is disposed over the front opening a set of electrical contacts operatively connect to the electrical meter.

The invention further comprises a top bracket 34 disposed over a top end 36 of the front opening and a bottom bracket 38 disposed over a bottom end 40 of the front opening. A top end 36 of the removable panel 22 is slid under the top bracket 34 and a bottom end 40 of the removable panel 22 is engaged with bottom bracket 38 and held in place by a locking mechanism inside of the box (not shown). The result is that the removable panel is held firmly over the front opening of the box.

The rectangular mounting flange 24 has a plurality of holes 44 for mounting the box to a structure outside surface. The holes include at least one centering hole 46.

The rear wall 20 comprises a plurality of access points or punch-outs 50 for wiring into the box. The plurality of access points 50 are offset from the plurality of holes 44 in the rectangular mounting flange 24 so that a screw or other mounting means placed in one of the plurality of holes will not contact a wire entering one of the plurality of access points.

The rectangular mounting flange 24 comprises a unitary frame and extends outward from the four side walls an equal predetermined distance (D) 52.

The edges 54 of the rectangular mounting flange 24 can be taped by tape 100 to the structure outside surface for moisture proofing. The box can also be disposed beneath a vapour barrier 102 of the structure for moisture proofing.

Although the description of the invention presented herein contains much specificity, these should not be construed as limiting the scope of the embodiments but merely providing illustrations of some of the several embodiments. The scope of the embodiments should be determined by the appended claims and their legal equivalents.

I claim:

1. A box for housing an electrical meter, comprising:
   four side walls, a rear wall and a front wall;
   a rectangular mounting flange fixed to and extending outward from the four side walls,
   the rectangular mounting flange being disposed a predetermined distance rearward of said front wall,
   wherein the front wall protrudes said predetermined distance from said rectangular mounting flange for easy access by an electrician;
   the rectangular mounting flange having a plurality of holes for mounting the electrical circuit box and the rear wall having a plurality of access points for wiring, the plurality of access points being offset from the plurality of holes in the rectangular mounting flange so that a screw in one of the plurality of holes will not contact a wire entering one of said plurality of access points.

2. The box of claim 1 wherein the front wall is a removable panel over a front opening for exposing a set of electrical contacts within the box.

3. The box of claim 2 wherein said removable panel includes a circular mounting flange for mounting said electrical meter.

4. The box of claim 3 wherein when the removable panel is disposed over said front opening said set of electrical contacts operatively connect to the electrical meter.

5. A box for housing an electrical meter, comprising:
   four side walls, a rear wall and a front wall;
   a rectangular mounting flange fixed to and extending outward from the four walls, the rectangular mounting flange being disposed a predetermined distance rearward of said front wall, wherein the front wall protrudes said predetermined distance from said rectangular mounting flange for easy access by an electrician and the front wall is a removable panel over a front opening for exposing a set of electrical contacts within the box;
   a top bracket disposed over a top end of the front opening and a bottom bracket disposed over a bottom end of the front opening, a top end of the removable panel being slid under said top bracket and a bottom end of the removable panel engaging the bottom bracket.

6. The box of claim 1 wherein said plurality of holes includes at least one centering hole.

7. The box of claim 1 the rectangular mounting flange comprises a unitary frame.

8. The box of claim 1 wherein the rectangular mounting flange extends outward from the four side walls an equal predetermined distance.

9. The box of claim 1 wherein the edges of the rectangular mounting flange are taped to a mounting surface for moisture proofing.

10. The box of claim 9 wherein the rectangular box is disposed beneath a vapour barrier for moisture proofing.

11. A box for housing an electrical meter, wherein the box comprises:
    four side walls and a rear wall having a plurality of access points for service wiring;
    a removable front panel defining a front plane disposed over a front opening for exposing a set of electrical contacts within the box, wherein said removable front panel includes a circular mounting flange for mounting said electrical meter;
    a top bracket disposed over a top end of said front opening and a bottom bracket disposed inside of a bottom end of the front opening, a top end of the removable panel being slid under said top bracket and a bottom end of the removable panel engaging the bottom bracket;
    a rectangular mounting flange surrounding the box, wherein said rectangular mounting flange:
    I. comprises a unitary frame fixed to and extending outward from the four walls;
    ii. includes a plurality of holes including at least one centering hole for mounting the electrical circuit box;
    iii. is disposed a predetermined distance rearward of said front plane;
    wherein said plurality of access points are offset from the plurality of holes in the rectangular mounting flange so that a screw in one of the plurality of holes will not contact a wire entering one of said plurality of access points.

* * * * *